United States Patent
Pfaffmann et al.

(10) Patent No.: US 12,111,640 B2
(45) Date of Patent: Oct. 8, 2024

(54) CONTROLLING PRODUCTION BY A SAMPLE ANALYSIS CONTROL LOOP USING COMMUNICATION BETWEEN COMPUTER SYSTEMS

(71) Applicant: BASF SE, Ludwigshafen (DE)

(72) Inventors: Michael Pfaffmann, Ludwigshafen (DE); Henry Hoppe, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 562 days.

(21) Appl. No.: 17/427,952

(22) PCT Filed: Feb. 18, 2020

(86) PCT No.: PCT/EP2020/054267
§ 371 (c)(1),
(2) Date: Aug. 3, 2021

(87) PCT Pub. No.: WO2020/169622
PCT Pub. Date: Aug. 27, 2020

(65) Prior Publication Data
US 2022/0128975 A1    Apr. 28, 2022

(30) Foreign Application Priority Data

Feb. 19, 2019 (EP) .................................... 19158158

(51) Int. Cl.
*G05B 19/418* (2006.01)
(52) U.S. Cl.
CPC ..... *G05B 19/4185* (2013.01); *G05B 19/4183* (2013.01); *G05B 19/4188* (2013.01)
(58) Field of Classification Search
None
See application file for complete search history.

(56) References Cited

U.S. PATENT DOCUMENTS

| 6,141,647 A * | 10/2000 | Meijer | G06Q 10/06 |
| | | | 700/109 |
| 2004/0200574 A1* | 10/2004 | Davis | G05B 19/41875 |
| | | | 156/345.24 |

(Continued)

FOREIGN PATENT DOCUMENTS

| EP | 2587323 A2 | 5/2013 |
| WO | WO-02/14965 A2 | 2/2002 |

OTHER PUBLICATIONS

Spangler, Laborinformations—Und Managementsysteme Konzeption Und Umsetzung Einer Unternehmensstrategie. Ölaboratory Information and Management Systems Concepts and Carrying out a Business Strategy, Automatisierungstechnische Praxis—ATP, Oldenbourg Industrieverlag, Munchen, DE, vol. 35, No. 11, pp. 619-623 (1993).

(Continued)

*Primary Examiner* — Bernard G Lindsay
(74) *Attorney, Agent, or Firm* — MARSHALL, GERSTEIN & BORUN LLP

(57) ABSTRACT

Computer systems support a production process with a first sub-process to process a chemical substance at a production site and with a second sub-process to analyze a physical sample of the chemical substance at a laboratory site. A process control system provides first type data (A) to identify physical samples, and a manufacturing system provides second type data (B) that are required to control a production process. Connector modules transmit the data (A, B) in a message to a laboratory system to obtain laboratory data, as an analysis result. The connector module that is associated with the laboratory system distributes the data according to the types. A control signal module derives a control signal for controlling the production process. This control signal (Continued)

closes a control loop for adjusting the first sub-process until the laboratory data shows compliance.

12 Claims, 8 Drawing Sheets

(56) References Cited

U.S. PATENT DOCUMENTS

| | | | | |
|---|---|---|---|---|
| 2010/0082121 | A1* | 4/2010 | Stephenson | G06N 5/047 |
| | | | | 700/28 |
| 2011/0045498 | A1* | 2/2011 | Lindberg | G01N 35/00029 |
| | | | | 435/283.1 |
| 2016/0339649 | A1* | 11/2016 | Rose | G01N 25/20 |
| 2019/0072464 | A1* | 3/2019 | Wiederin | G01N 1/405 |
| 2019/0079061 | A1* | 3/2019 | Unnerstall | G01N 30/38 |

OTHER PUBLICATIONS

International Application No. PCT/EP2020/054267, International Search Report and Written Opinion, mailed Apr. 30, 2020.

* cited by examiner

CONTROLLING PRODUCTION BY A SAMPLE ANALYSIS CONTROL LOOP USING COMMUNICATION BETWEEN COMPUTER SYSTEMS

CROSS-REFERENCE TO RELATED APPLICATIONS

This is the U.S. national phase of International Application No. PCT/EP2020/054267, filed Feb. 18, 2020, which claims the benefit of European Patent Application No. 19158158.6, filed on Feb. 19, 2019.

TECHNICAL FIELD

In general, the disclosure relates to the communication between computer systems, and more in particular, it relates to the communication between computer systems that are associated with production sites and with laboratory sites, wherein the communication comprises data in relation to a physical sample that is being forwarded from the production site to the laboratory site.

BACKGROUND

In chemical industry, there are production sites and laboratory sites. Both sides employ computer systems, and the communication between both sides is becoming more and more a computer-implemented communication.

However, the computers can't communicate everything. The operators of the production site take physical samples of materials (and/or of products) and forward the samples to the laboratory site. The laboratory analyzes the samples and provides the analysis results as laboratory data. Laboratory data comprises measurement data in combination with meta-data that identifies the sample and the conditions under that the samples have been taken. The operators can then use the laboratory data to control the production process, for example by adjusting production parameters so that the product finally complies with predefined specifications.

The computers interact with each other according to pre-defined conventions that are outlined in standards. One example is the IEC 62264 series "Enterprise-control system integration", with Part 1: Models and terminology (2013-05), Part 2: Objects and attributes for enterprise-control system integration (2013-06), Part 3: Activity models of manufacturing operations management (2016-12), Part 4: Objects and attributes for manufacturing operations management integration (2015-12), and with further parts.

According to these standards, computer systems are classified into levels. Just to mention only some computer systems, Manufacturing Execution Systems (IVIES) in level 3 belong to the production site and control the operation of production or manufacturing equipment (such as machines and chemical reactors). In level 2 there are Distributed Control Systems (DCS) and Process Control Systems (PCS). Laboratory Information and Management Systems (LIMS) in level 3 belong to the laboratories and assist in tracking the samples and the laboratory data.

There are further systems, such as Enterprise Resource Planning (ERP) systems (in level 4) that provide guidance to the operators regarding the production (e.g., availability of materials) and that receive data that relates to manufacturing (e.g., the use of materials during production). Quality assurance (QA) systems (in level 4) aggregate laboratory data according product standards and/or product specifications and derive compliance or non-compliance statements.

Involving human operators at the interfaces between the computer systems (and the equipment) should be minimized. To give an example here, the physical samples are identified by sample identification numbers ("sample IDs") that are allocated by the LIMS. The sample IDs are printed on tags (or labels) that are attached to the samples (or to containers that carry the samples). Such an approach reduces the likelihood of errors potentially introduced by the human operators (e.g., accidentally confusing physical samples when they arrive at the laboratory).

However, the sample IDs must be communicated from the LIMS (in the laboratory) to a tag printer (at the production site). The tag printer can be associated with an IVIES or can be a stand-alone device. Communication errors can occur as well.

Further, as technical systems (i.e., production and/or analysis equipment, as well as computers) do occasionally fail or show deviations from expected and pre-defined operation, the computer systems must be robust and relatively fast in reacting to such situations and/or to production disturbance. Again to take one example only, if particular equipment fails, the production may be interrupted. As a consequence, taking samples needs adjustments as well (e.g., starting a new sample cycle, disregarding samples and sample-related data). As such adjustment can involve the LIMS, information regarding production interruption and production resumption has to be communicated to the LIMS.

Despite standardization, the computer-to-computer interaction needs adaptations in advance. For example, a "sample" in one computer system may be coded as "probe" or "test piece" in another system. There is a need to make computer-implemented controlling more efficient in terms of reducing delay times, avoiding data communication obstacles due to different conventions and/or occasional human interaction, and reducing the complexity of communication participants.

US 2004/200574 A1 (Davis et al.) describes a production facility for semiconductor substrates (or "wafer fab"). The facility comprises processing units such as etch reactors and metrology tools. As taking samples from semiconductor wafers is not possible, the metrology tools are located closely to the processing units. A system controllers acts for both the units and the tools.

WO 02/14965 A2 refers to manufacturing execution systems (IVIES). The document describes an adapter interface that allows the communication between the MES and other tools even if standardization is insufficient.

The paper "Laborinformations-und Managementsysteme. Konzeption und Umsetzung einer Unternehmensstrategie", by Norbert Spangler, Automatisierungstechnische Praxis 35, November 1993, describes a strategical approach to deploy a laboratory information and management system (LIMS) for a large company in chemical industry.

SUMMARY

Computer systems support a production process with a first sub-process to process a chemical substance at a production site and with a second sub-process to analyze a physical sample of the chemical substance at a laboratory site.

A process control system provides first type data (A) to identify physical samples, and a manufacturing system provides second type data (B) that is required to control a production process. Connector modules transmit the data (A, B) in a message to a laboratory system to obtain laboratory data, as the result of the analysis.

Also, the connector module that is associated with the laboratory system distributes the data according to the types. A control signal module derives a control signal for controlling the production process. This control signal closes a control loop so that the first sub-process can be adjusted until the laboratory data shows compliance.

According to embodiments of the present invention, a computer-implemented method provides a control signal for a production process. The production process has a first sub-process by that a production unit processes a chemical substance at a production site, and has a second sub-process by that a physical sample of the chemical substance is analyzed by an analytical instrument at a laboratory site.

There are one or more computer systems at the production site—collectively the production systems—such as one or more process control systems and one or more manufacturing systems. There are also computer systems at the laboratory site—collectively the laboratory systems—such as one or more laboratory data systems and, optionally, one or more instrument control systems.

The method comprises operating a first connector module that is associated with the one or more production systems, and operating a second connector module associated with the one or more laboratory systems. The connector modules are communicatively coupled to enable the communication between the computer systems.

First type data (A) comprises identifiers to particular physical samples. The identifiers enable the production systems and the laboratory systems to access data that relates to the particular physical samples (by being references in both systems). Second type data (B) comprises data required to derive the control signal to control the operation of the production unit, after a point in time when the physical samples have been analyzed by the analytical instruments.

The first connector module receives first type data (A) from one or more process control systems and second type data (B) from one or more manufacturing systems. The first connector module composes a message with first type data (A) and with second type data (B). The first connector module transmits the message to the second connector module. The second connector module receives the message. The second connector module sends the first type data (A) through the one or more laboratory systems to the analytical instrument, causing the analytical instrument to analyze the physical sample and to obtain sample-related laboratory data. The second connector module sends second type data (B) to a control signal module. The control signal module derives the control signal for controlling the operation of the production unit at the production site. The control signal module derives the control signal by using laboratory data and second type data (B).

Second type data (B) is usually not required to perform the analysis, but having it transmitted in the message (together with (A)) allows the control signal module to derive the control signal without interrogating the production systems. This approach can reduce the overall delay that is inherent to controlling and to using control loops. Since transmitting data is faster than forwarding the physical sample, the analytical instrument can be prepared to start the analysis as soon as the physical sample arrives, without significant delay.

Optionally, the first connector module composes the message at the application layer of the Open Systems Interconnection (OSI) layers according to ITU-T X.200 (07/94).

Optionally, the first connector module transmits the message via the Hypertext Transfer Protocol Secure (HTTPS) protocol.

Optionally, the first connector module composes the message by using predefined templates with pre-defined data-structures having pre-defined fields. Optionally, the first connector module composes the message by using pre-defined templates by that the pre-defined data-structures indicate status data relating to the production unit.

Optionally, the control signal module applies a validator function that validates the laboratory data in reference to a pre-defined specification and that derives the control signal as a validation control signal that instructs the production unit to continue processing the chemical substance in case of compliance with the pre-defined specification, or to interrupt processing otherwise.

Optionally, the control signal module applies a corrector function that uses the laboratory data and the second type data (B) in reference to the pre-defined specification that derives the control signal as a corrective control signal that instructs the production unit to continue processing the chemical substance according to particular technical parameters that are communicated by the corrective control signal.

Optionally, the control signal module communicates the control signal to the manufacturing system at the production site via the second connector module.

Optionally, the second connector module sends messages with first type data (A) in advance of taking samples. This option take into account that assigning identification for physical samples—the sample IDs—is an activity that is exclusively performed by a laboratory data system that belongs to the laboratory systems.

Optionally, the control signal module, after having derived the control signal, sends it to the production unit at the production site, thereby the feedback loop is being closed.

A computer program product that—when loaded into a memory of a computer and being executed by at least one processor of the computer—performs the steps of the computer-implemented method.

A computer system for providing a control signal for a production process comprises connector modules and comprises a control signal module. The computer system is adapted to perform the computer-implemented method.

DETAILED DESCRIPTION

Introduction

The description starts with an overview to production and laboratory sites and to computer systems. The overview shows increasing complexity and other constraints and technical problems that may occur in traditional approaches. The description will then explain technical solutions. Occasionally the solutions use synergy effects.

Writing Convention

References such as "110-1/2/3" are short forms for "110-1, 110-2, and 110-3". Words in uppercase letters such as WATER or SALT stand for substances. The computer systems can communicate data by exchanging messages. The messages can be coded in formats that are outlined in the above-mentioned standards (e.g., IEC 62264). For simplicity, the description occasionally uses pseudo-code examples, such as <time> . . . </time> indicating data that represent a time point (e.g. with year yyyy, month mm, day dd, hour hh and minute mm), such as <sample ID> . . . </sample ID> indicating a sample ID and so on. The pseudo-code examples are similar to conventions used in implementations, among them XML (Extensible Markup Language) and JSON (JavaScript Object Notation). The term "sample" refers to material samples, i.e. to limited quantities of substances.

The term "data type" differentiates data according to the function of the data (to identify a sample, to control the production). Term like "sample data", "laboratory data" and so on differentiate according to data flow between different computer systems.

Figure 1:
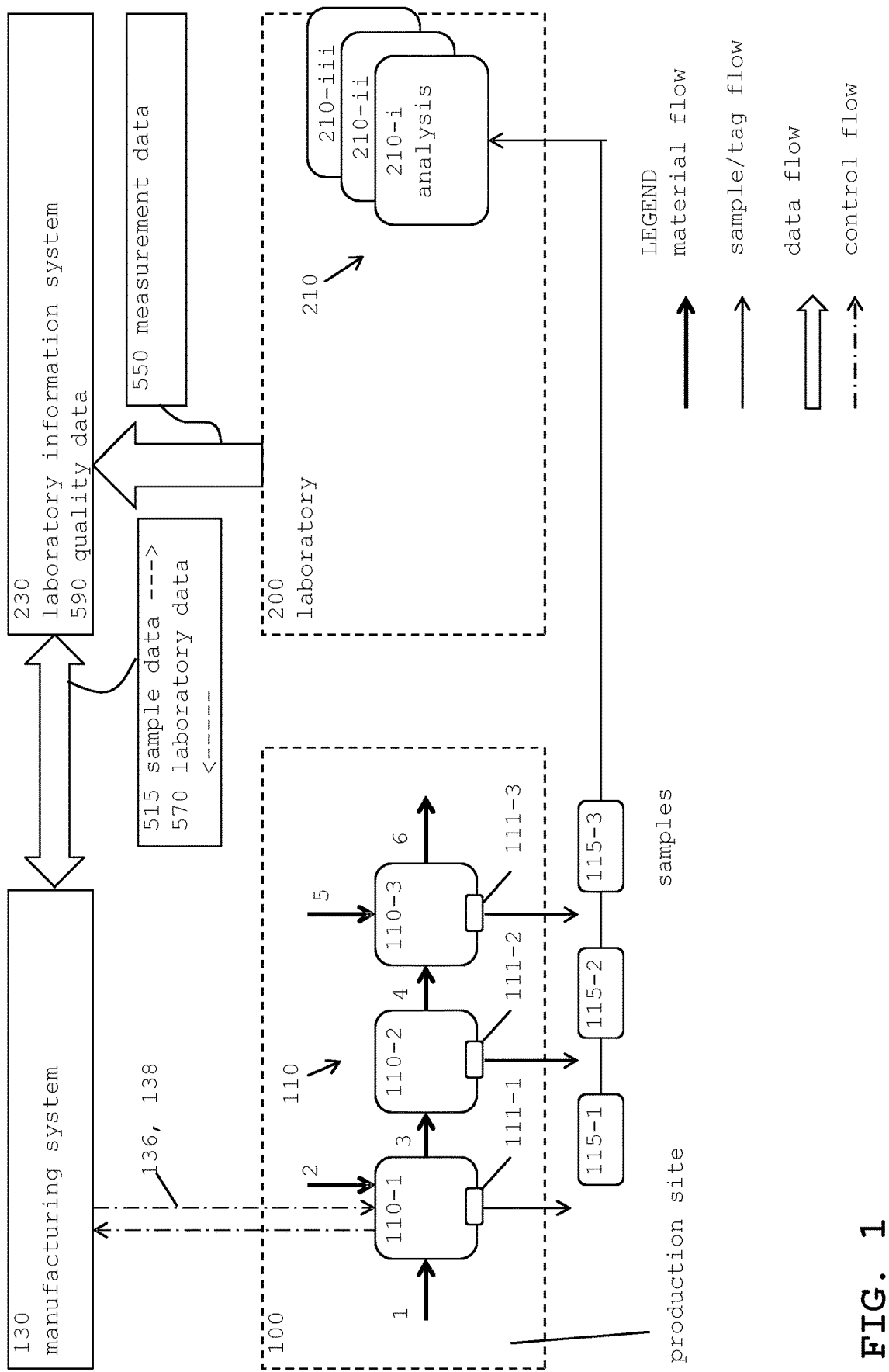
FIG. 1 illustrates an overview to a production site and to a laboratory site.

FIG. 1 illustrates an overview to production site 100 (such as a plant, a factory, or a manufacturing facility) and to laboratory site 200. The overview takes the particulars of the chemical industry into account and illustrates a first use-case scenario.

Computer system 130 is associated with production site 100. For simplicity, it is assumed that system 130 is physically located within production site 100, but that is not required. For convenience, computer system 130 can be regarded as a manufacturing computer system, and can be implemented by a commercially available system, such as by one of the above-mentioned manufacturing execution systems (IVIES). For simplicity, system 130 is referred to as "manufacturing system".

Computer system 230 is associated with laboratory site 200. For simplicity, it is assumed that system 230 is located at laboratory site 200, but that is no required either. For convenience, computer system 230 can be regarded as a "laboratory data system" (cf. the label in the figure), and can be implemented as a commercially available system, such as by a laboratory information and management system (LIMS).

Production site 100 comprises production units 110-1, 110-2 and 110-3 (collectively units 110). To name only a few examples, production units can be chemical reactors (to heat or cool substances, to let substances react with each other, to mix substances, to measure quantities etc.), storage tanks, packaging machinery, vehicles etc. The operation of production units 110 is supervised by human users, in the following the "operators". For simplicity, the operators are omitted from the figures.

Production units 110 can operate in different modes, such as batch production, flow production or continuous production.

Production units 110 allow the operators to take physical samples (or test materials). For this purpose, the operators can use special tools (such as sampling spoons or sampling ladles), the operators can take samples from dedicated openings in the equipment, or otherwise. To keep the overview as simple as possible, production units 110-1/2/3 are illustrated with openings 111-1/2/3 that allow the operators to take samples 115-1/2/3, respectively. Skilled persons can arrange implementations that take samples automatically. In the figure, openings 111-1/2/3 just indicate the origin of the samples from particular production unit 110-1/2/3. It is assumed that multiple samples are taken over time at consecutive time points t1, t2 etc.

Laboratory site 200 comprises analytical instrument 210 (i.e., analysis equipment). For this overview example, analytical instrument 210 is assumed to be a set or collection of instruments with spectrometer 210-$i$ (e.g. to measure color, and/or the ratio of components within a substance), viscometer 210-$ii$ (to measure the viscosity), and pH meter 210-$iii$.

Flows (Material, Sample, Control, Data)

In the figure, arrows indicate different flows (and at least implicitly indicate physical connections between pieces of equipment).

There is a material flow (bold arrows), here into production unit 110-1, from production unit 110-1 to 110-2, from 110-2 to 110-3, into production unit 110-3, as well as material flow from production unit 110-3. Simplified, production site 100 processes materials to intermediate products, and production site 100 processes the intermediate products to final products. Optionally, further materials are being processed as well. Shipping the final products (away from production site 100) is assumed to be conditional upon compliance with pre-defined specifications and/or quality standards. Occasionally, the materials are called substances, but both terms are used as synonyms.

The material flow can be related to further processes that occur before, during or after processes performed by production units 110-1/2/3. To stay with the simplified example, there is a pre-process with delivering materials to production site 100, and in many cases with testing materials. Or, there is a post-process (or follow-up process) to physically transport final products out of the production site. The post-process can comprise preparation activities. For example, a tank truck can drive to the production site to be ready for being loaded.

There is a sample flow, in the example, with samples 115-1/2/3 taken from production unit 110-1/2/3, respectively, and being forwarded to analytical instrument 210 (i.e., to laboratory site 200). T SAMPLE stands for the overall duration of taking the sample (from production unit 110 one production site 100) and to forward the sample from production site 100 to laboratory site 200. T SAMPLE can be specific for samples 115-1/2/3. T SAMPLE can't be neglected and can't be shortened. However, as it will be explained below, the effects of T SAMPLE can be minimized.

It is noted that samples can be taken even during the performance of the mentioned pre- or post-processes. Samples of materials (at the input) and samples of final products (at the output) can go to the laboratory as well.

A control flow indicates control signals (dashed and dotted lines). The figure illustrates control signals as signals from computer system 130 to production unit 110-1. The illustration is simplified. Control signals can arrive at the production units from other computer systems (cf. process control system 120 in FIG. 2, from systems 120/130 via reference 135/137 in FIG. 5). For simplicity, further control signals are omitted. Control signals have many functions, among them to let production units start and/or stop operating, let actuators within the production units operate (e.g., open or close a valve to allow or deny material flow to and from production units, to open an opening 111-1/2/3 etc.), and let sensors communicate measurement data (e.g., temperature readings) to a computer system (e.g., to system 130).

Examples for control signals are corrective control signal 136 and validation control signal 138 that will be explained below. Control signals 136/138 goes to production site 100 (to production units, illustrated by unit 110-1 only).

There is no limitation to production site 100. Optionally, control signals 136/138 can go to equipment that is active in a pre-process or in a post-process. For example, a control signal can indicate that a particular material can be transported to site 100 (pre-process), or that a particular final product can be shipped from site 100 (post-process, for example by the tank truck that has already arrived).

There are data flows between computer systems 130 and 110. Manufacturing system 130 sends sample data 515 to laboratory data system 230. Sample data comprises data relating to the samples (such as sample IDs and technical parameters). Laboratory data system 230 sends laboratory data 570 to manufacturing system 130. There is also a data flow from analytical instrument 210 (within laboratory site 200) to laboratory data system 230, with measurement data 550. Data flows are understood to involve computer-to-computer communication. But occasionally, operators of analytical instrument 210 may still interact with laboratory data system 230 manually. For simplicity, the figure does not use further indices 1/2/3, but particular data examples belonging to particular samples and particular analytical instruments and so on will be explained below.

From an overall perspective, there is also a data flow that leaves the systems: quality data 590 indicates the quality of the product(s). To be more precise, quality data 590 indicates the compliance of the product(s) with predefined criteria outlined is pre-defined specifications or quality standards. It is desired that quality data 590 becomes available at one place. FIG. 1 illustrates this one place as the computer at the right upper corner (here: the laboratory data system).

It is noted that data 515, 570, 550, 590 can comprise data with two types: first type data (A) and second type data (B). In short and with details below, sample data 515 does not only comprise a sample ID (first type data (A)), but also data (second type data (B)) required to derive the control signal (to control the production). The other data flows can comprise (A) and (B) as well.

Still referring to FIG. 1 and using UPPERCASE letters for substances, a first production example is introduced by way of example with a chain of inter-connected reactors (i.e., production units 110-1/2/3).

In a first processing step, first reactor 110-1 should mix particular SALT 1 into WATER 2 to SOLUTION 3 (being an intermediate product).

In a second processing step, second reactor 110-2 should heat SOLUTION 3 to a temperature within a particular range so that a particular chemical reaction occurs. HEATED SOLUTION 4 is an intermediate product as well.

In a third processing step, second reactor 110-3 should add COLOR 5 so that the final product is COLORED SOLUTION 6.

Computer system 130 controls the reactors by forwarding control signals, such as to fill in WATER (through a valve), to scale particular amounts of SALT and COLOR, to heat up reactor 110-2 to the particular temperature etc. The arrow from system 130 to production unit 110-1 (i.e., reactor) is bidirectional and thereby symbolizes that signals go in the other direction, to system 130 as well (e.g. signals that carry measurement results from sensors).

At some time points during production, physical samples (or specimen) can be taken and physically carried to the laboratory site, to obtain the following:

WATER quality data (e.g., the amount of bacteria in view of thresholds)

SOLUTION quality data (e.g., the fraction of the SALT dissolved in the WATER, the pH value)

COLORED SOLUTION quality data (e.g., the color)

The person of skill in the art understands that analytical instrument 210 is used accordingly. There is no need to analyze everything for every sample. For example spectrometer 210-i is not used before COLOR has been added. An assignment of samples 115-1/2/3 to analytical instrument 210-1/2/3 can be pre-defined in a matrix. Assignment information can be communicated in the data flow, or pre-defined assignment information can be stored in laboratory data system 230.

The person of skill in the art can apply triggers so that samples are taken when pre-defined conditions are complied with. For example, sample 115-1 is taken (from reactor 110-1) when SALT and WATER have been mixed for a minimal duration T MIX (e.g., T MIX=30 minutes), and sample 115-2 is taken when the temperature within reactor 110-2 reaches the predefined value.

Figure 5:
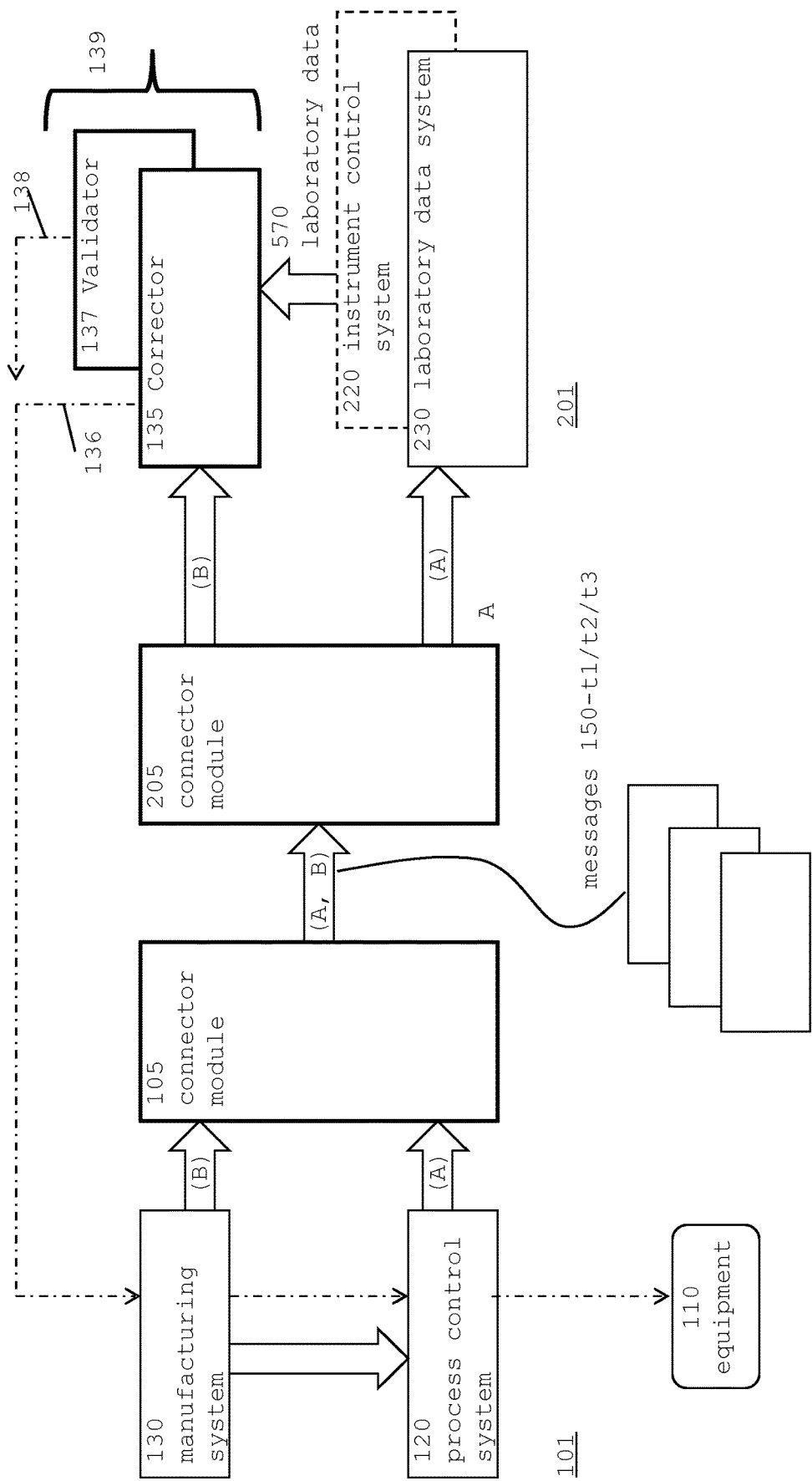
FIG. 5 illustrates an implementation for the data flow by using connector modules at the production site and at the laboratory site.

It is noted that data regarding the conditions (e.g., actual mixing duration 25 minutes, or 35 minutes) can be communicated as sample data 515 as well (to be processed by control signal module 139, cf. FIG. 5).

Dual Purpose of Laboratory Data

The manufacturer (i.e., the operator) has two goals that are interrelated:

being a goal to control the production, to accommodate technical deviations during production (deviations of technical parameters such as parameters regarding the production unit, material parameters, time-parameters and so on), and being a QA goal, to ship products that do not deviate from pre-defined specifications.

The control goal mainly affects the production site internally, and the QA goal mainly affects the products that leave the production site. These two goals are now discussed from two perspectives to laboratory data 570. It will be shown that laboratory data has a dual purpose.

Control Loop to Accommodate Technical Deviations During Production

There is a first perspective of the manufacturer (in the example the operator of the reactors) to make sure that the COLORED SOLUTION complies with a pre-defined specification even if deviations occur during production. The laboratory site provides laboratory data (to the operator, for example, via system 130), and the laboratory data allows the determination of compliance or non-compliance (cf. the concept of quality data 590).

In the example, it is assumed that reactor 110-2 forwards SOLUTION to reactor 110-3 only when sample 115-2 has passed the compliance test (e.g., pre-defined viscosity, WATER/SALT ratio etc.). In the example, this approach prevents adding COLOR to a non-compliant SOLUTION. This first perspective relates a particular production steps (here in the reactors) that can be controlled during operation. Corrections are possible. For example, if a particular analysis reveals an inappropriate SALT/WATER ratio, this can be corrected by adding SALT, or adding WATER as the case may be. Or, if the color substance is not sufficient within reactor 110-3 (spectrometer 210-i), COLOR can be added.

Not all deviations can be corrected, but a non-correctable deviation can be detected so that the control results in cancelling the production. For example, a ratio above a pre-defined threshold can lead to a cancellation (of the production).

In that sense, laboratory 200 can be considered as part of a control loop, or feedback loop. The laboratory provides measurement data that can be used to calculate the operation of an actuator (e.g., a valve at a reactor to add WATER, SALT, COLOR etc.) so that a pre-defined set-point (e.g., SALT/WATER ratio, COLOR etc.) can be reached.

To summarize this perspective: laboratory data 570 can be used to control the production of the product.

In the broadest view, the control loop goes across system borders: the loop relates to manufacturing system 130 (production site), and to laboratory data system 230 (laboratory site).

Quality Assurance

There is a second perspective (of the manufacturer) to allow shipping the product (e.g., COLORED SOLUTION) only when pre-defined analysis steps (in the laboratory) indicate compliance. For example, the SALT/WATER ratio (sample 115-1) must have been within a tolerance band before forwarding the SOLUTION to reactor 110-2. The viscosity of the HEATED SOLUTION must have been within a tolerance band, etc. Individual analysis data are being aggregated (in the sense of checking compliance points in a specification). This does not exclude the option to keep a record about the various SALT/WATER ratios etc. that occurred during production.

This (second) perspective can be viewed as quality assurance QA that enhances the product (e.g., COLORED SOLUTION) by quality data 590.

Quality data 590 is related to the product (being shipped, or eventually not shipped). Persons of skill in the art (data binding) can add meta-data. Quality data 590 can have different forms, ranging from a compliance/non-compliance statement to an (automatically generated) documentation. But quality data 590 describes a technical system (e.g., production units, and the computers).

Persons of skill in the art can use technical measures to assure integrity, authenticity etc. of the documentation. In the example of FIG. 1, quality assurance QA can be provided by laboratory data system 230. It can, however, be provided by further computer systems, as explained in the following.

To summarize this perspective: laboratory data 570 can also be used to ensure the compliance of the product (with pre-defined specifications).

Constraints

Meeting both goals requires laboratory data 570 to be collected and to be processed into control signals 136/138, and to laboratory data 570 that is to be processed into quality data 590. The control signals control the production units. In the example, the production units being reactors, the control signals let reactor valves for a particular duration. Simplified, laboratory data 570 is aggregated to quality data 570.

A control loop inherently exhibits a delay T DELAY. In this case, T DELAY includes (at least) the sample forwarding time T SAMPLE, the time T ANALYSIS for analyzing the sample and obtain laboratory data, the time T CALC for calculating corrective control signal 136 (by using laboratory data), and the time it takes to communicate the control signal to a particular production unit T SIGNAL. These 4 time periods occur consecutively, and T DELAY can be estimated as T DELAY>=T SAMPLE+T ANALYSIS+T CALC+T SIGNAL.

As already mentioned, T SAMPLE can't be shorted. Forwarding the samples to the laboratory is accompanied by transmitting data (in parallel) by messages as explained in connection with FIGS. 5-6. As transmitting data is inherently faster than moving physical samples, data transmission time can be neglected.

Figure 4:
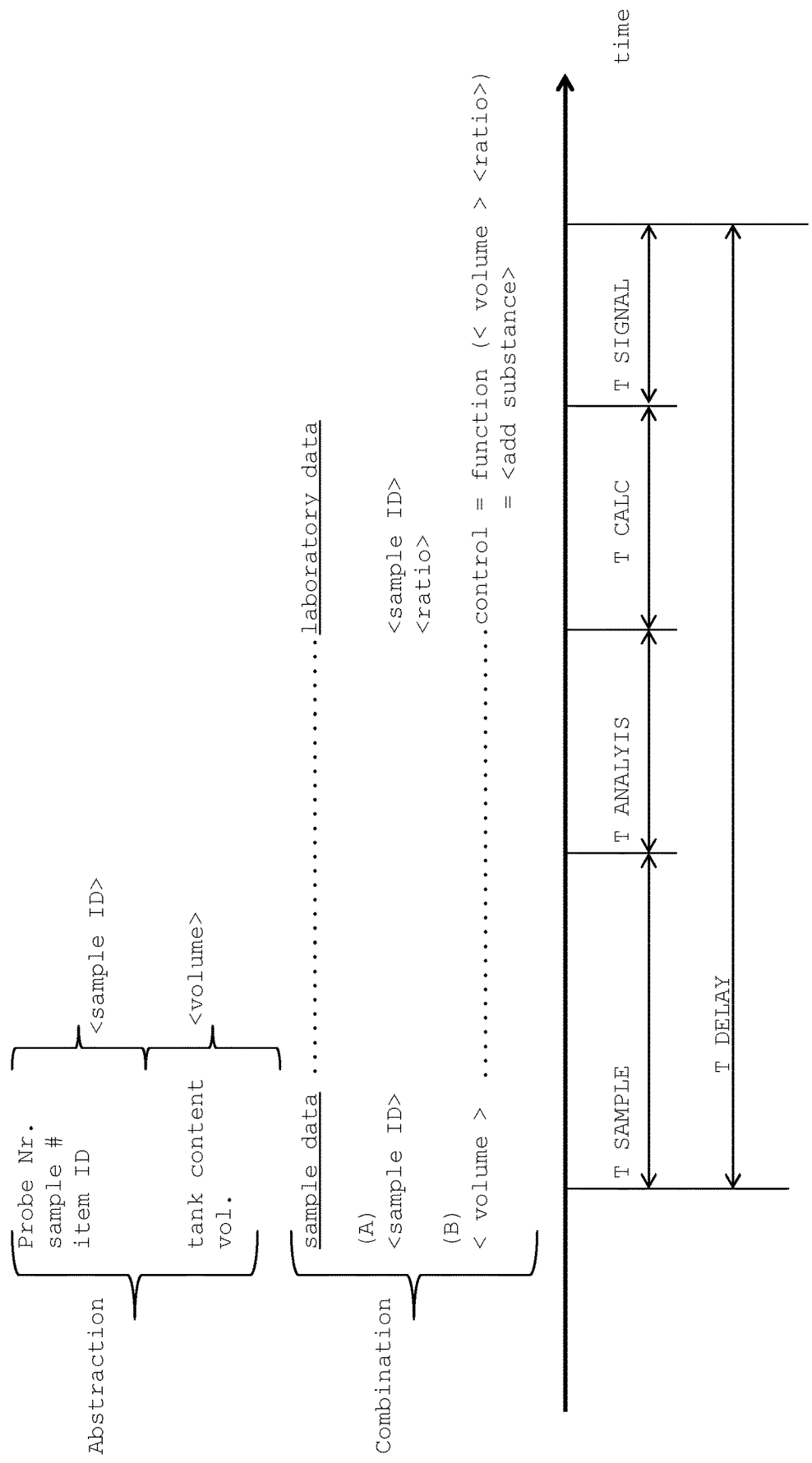
FIG. 4 illustrates a time diagram that accompanies a data flow from a production system at the production site to a laboratory system at the laboratory site.

T ANALYSIS can be shortened (cf. FIG. 4). T CALC can be shortened by collecting data in advance (cf. FIGS. 5-6 with data (B) communicated at a point in time when it is not yes required). T SIGNAL can be shortened, similar as T CALC when the particular production unit is identified by the control signal (e.g., in an addressing header) and/or if the routing of the control signal is optimized. Forwarding messages as push messages further reduces T SIGNAL. Signal propagation time (that acts on T SIGNAL) can be neglected.

As it will be explained, calculating corrective control signal 136 is not required in all cases (i.e., T CALC=0).

Incorrectly communicating laboratory data 570 prevents efficiently controlling the production (via signals 136/138), and prevents the correctness of the quality assurance documentation (cf. quality data 590).

Further Complexity

Further, manufacturing is not as easy as explained in FIG. 1. As it will be explained, further computer systems provide and consume further data (cf. FIG. 2, transmit data and receive data). Scaling the production usually can involve operating further production sites with manufacturing systems and/or further laboratories with laboratory systems. It is expected that the system are different (cf. FIG. 3).

In view of the above-given explanations regarding production units (e.g., reactors, tanks, vehicles), the further manufacturing sites can be equipment that participates in pre-processes and in post-processes. For example, the delivery of SALT and WATER to production site 100 can be controlled as if the delivery equipment (e.g., storage, vehicles) are production units. If samples of SALT or samples of WATER indicate non-compliance with particular quality standards, further processing within manufacturing site 100 can be controlled accordingly (e.g., changing the recipe, stopping the production). Also, shipping of COLORED SOLUTION can be prevented if needed.

There is also an aspect of timing: the control signals can also trigger activities that are related to the pre- and the post-processes. For example, such an activity would be the have sufficient SALT in storage, or to let transport vehicles (e.g., tank truck) arrive at production site 100 in due time (i.e., before the production is finished). The timing can be related to quality assurance QA. If—for example—a vehicle arrives while production is ongoing (e.g., COLORED SOLUTION not yet ready) and the QA denies shipment, the vehicle would just return empty.

Further Computer Systems

Figure 2:
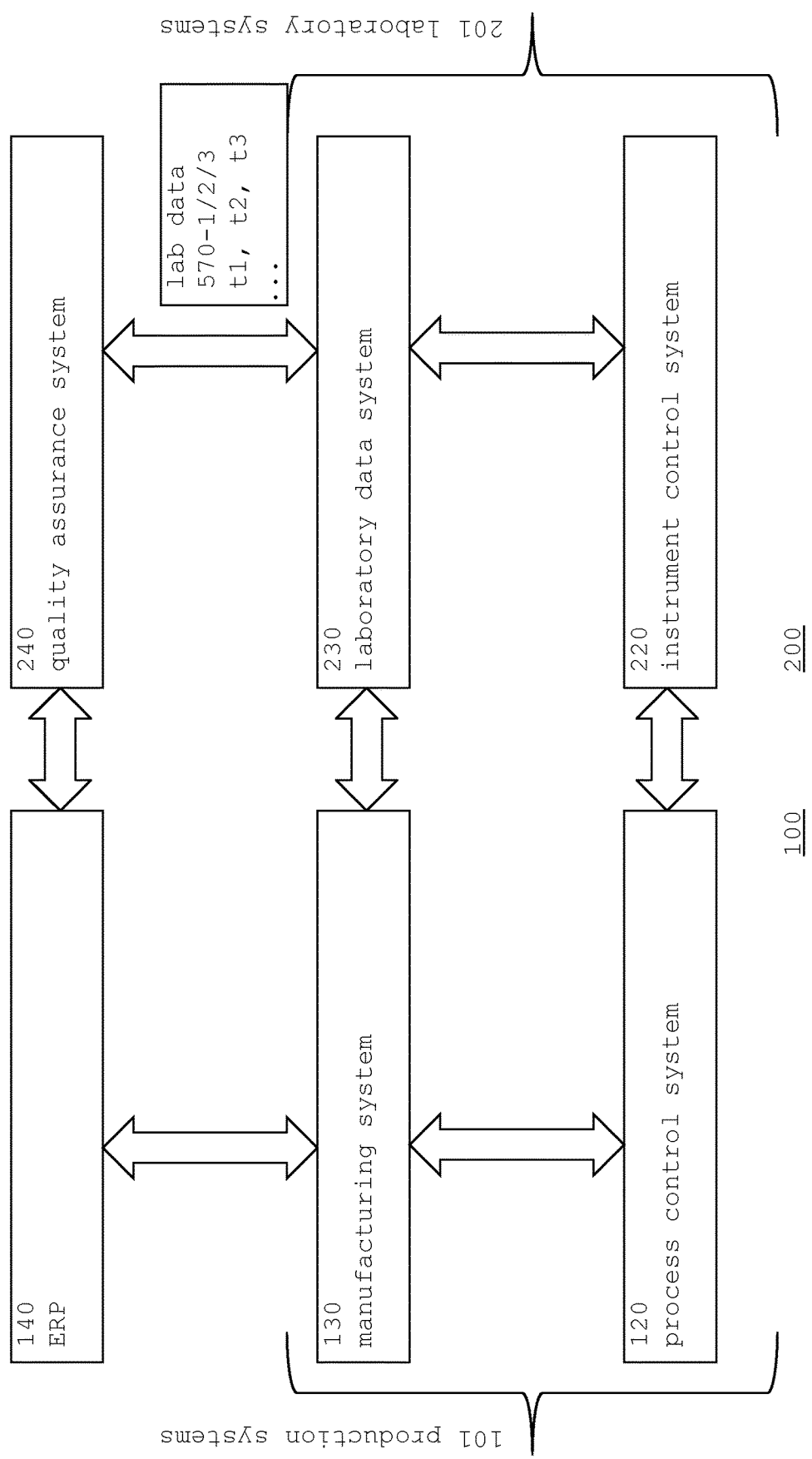
FIG. 2 illustrates an overview to the production site and to the laboratory site, with further computer systems.

FIG. 2 illustrates an overview to production site 100 and to laboratory site 200 with further computer systems. FIG. 2 repeats illustrating manufacturing system 130 and laboratory data system 230 (both in level 3), but also illustrates systems at level 4 (above) and at level 2 (below).

Manufacturing system 130 communicates with enterprise resource planning (ERP) system 140 (level 4), and laboratory data system 230 communicates with quality assurance (QA) system 240 (level 4).

Simplified, ERP system 140 has a number of functions. In this case, EPR system 140 ensures that production site 100 (cf. FIG. 1, with its production units) operates by receiving materials and by shipping products. QA system 240 provides the QA function. There is a separation of concern: laboratory data system 230 is specialized in providing laboratory data (i.e., measurement data relating to the samples, plus meta-data as introduced above) and QA system 240 is specialized in aggregating laboratory data, to quality documentation or the like, as explained above. Both systems 230 and 240 can be physically implemented together.

It is contemplated hat QA system 240 sends a compliance statement to ERP system 140. Therefore EPP system 140 can trigger shipment (or prevent shipment). But at least the above mentioned constraint to collect and transmit quality data remains. The compliance statement is indicative of the status of the technical system (e.g., the production units in combination with the computers) that has produced the product.

Optionally, manufacturing system 130 also communicates with process control system (PCS) 120 (level 2). System 120 can be a distributed control system (DCS) with controllers associated with production units 110. Control signals (for example, to open or close a valve, or to communicate measurement values) can go through PCS 120 as well.

Optionally, laboratory data system 230 also communicates with instrument control system 220. System 220 can be a distributed control system (DCS) with controllers associated with analytical instrument 210. Analytical instrument 210 can be controlled by computers having operating systems, firmware, software to run the analysis and the like. The computers of analytical instrument 210 can belong to instrument control system 220. The main function of instrument control system 220 is to communicate measurement value from analytical instrument 210 to laboratory data system 230.

It is noted that the data flow between the systems complies with the IEC-62264-levels conventions.

FIG. 2 introduces a classification by that manufacturing system 130 and process control system 120 belong to (one or more) production systems 101, and by that laboratory data system 230 and instrument control system 220 belong to (one or more) laboratory systems 202.

While production systems 101 are usually designed for controlling the production (cf. first perspective), laboratory systems 201 are usually designed for obtaining laboratory data. Different data conventions across the systems are a constraint as well.

Figure 3:
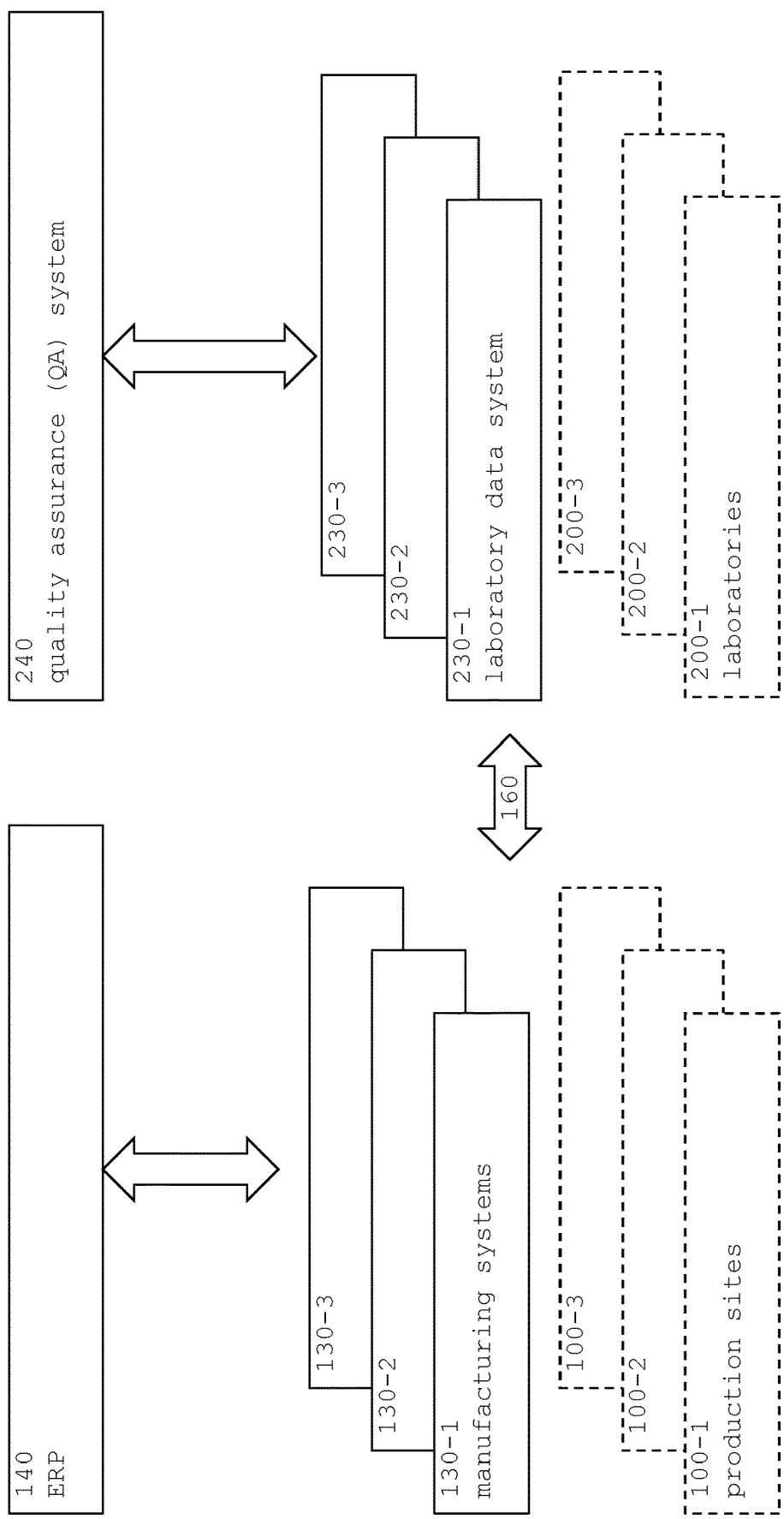
FIG. 3 illustrates an overview to the following computer systems: ERP system, QA system, manufacturing systems, and laboratory data systems.

FIG. 3 illustrates an overview to the computer systems: ERP system 140, QA system 240, manufacturing systems 130-1, 130-2, 130-3, and laboratory data systems 230-1, 230-2, and 230-3.

The first production example is slightly modified, by adding further reactors. While FIG. 1 illustrates a first set of reactors 110-1, 110-2 and 110-3 in production site 100, FIG. 2 just symbolizes further sets of reactors in further sites. Much simplified, production site 100-1 is associated with manufacturing system 130-1, production site 100-2 with manufacturing system 130-2 and production site 100-3 with manufacturing system 130-3.

To avoid sample forwarding times T SAMPLE that are too long for efficiently controlling the production, production sites 100-1/2/3 can have their own laboratories 200-1/2/3 and their own laboratory data systems 230-1/2/3. Or, one laboratory can serve multiple production sites. In addition to that, the laboratory may be equipped with different analytical instruments. For example, only one laboratory may have spectrometer 210-$i$. As a consequence, one physical sample (or a part of the sample) would have to be forwarded from one laboratory to another laboratory. Still further, the laboratories may have laboratory data systems (and or process control systems) that use different data conventions.

Under such constraints, a customer should have ordered such a quantity of COLORED SOLUTION that can only be produced (within a predefined time period from order to shipment, technical restrictions of the production units) by the production sites of FIG. 3 (i.e., 3 sets of 3 reactors, 3 manufacturing systems). The customer should be associated with a particular customer computer system (e.g., a system interacting with ERP system 140). ERP system 140 communicates with manufacturing systems 130-1, 130-2 and 130-3 so that the production of COLORED SOLUTION is shared between all reactors. It is understood that the different sites are operated by different human operators.

Regarding quality assurance QA (the second perspective), the laboratories should send laboratory data 570 (cf. FIG. 1) relating to the order so that quality data 590 (cf. FIG. 1) can be issued when all 3 sites have finalized the production. Despite splitting the production, the products must comply with the same technical specification.

Communication between manufacturing systems 130 and laboratory data systems 230 can be supported by communication tools 160 such as routers, switches and so on. The persons of skill in the art can implement them.

It is noted that FIG. 3 is simplified in the sense of not illustrating the process control systems (cf. systems 120 and 220 in FIG. 2).

Although simplified, the figures shows complexity and the potential constraints in the data exchange.

Solution to the Constraints: Abstraction and Combination

FIG. 4 illustrates a time diagram that accompanies the data flow, from one of production systems 101 at production site 100 (or sites) to one of laboratory systems 201 at laboratory 200 (or laboratories), thereby showing the concepts of abstraction and combination. Time progresses from left to right. At this point, the description does not differentiate particular systems. Production systems 101 can be manufacturing system 130 and/or process control system 120; and laboratory systems 201 can be laboratory data system 230 and/or instrument control system 220.

To address the constraint of the different data conventions, the communication between the systems uses abstraction: transmitting data comprises coding data from a system-specific format (of the transmitting computer system) to a system-non-specific format, and receiving data comprises de-coding from the system-non-specific format to the system-ic, specific format (of the receiving computer system).

FIG. 4 symbolizes this by giving the example for (fictitious) descriptors "Probe Nr.", "sample #" and "item ID", that are used by different computer systems (such as manufacturing system 130-1/2/3) to identify a particular sample. These descriptors show the system-specific format. There is coding into a system-non-specific format, here symbolized by "<sample ID>".

Optionally, there is decoding, but for convenience of explanation, it is assumed that "<sample ID>" is a system-non-specific format that is understood by all laboratory data systems 230-1/2/3 even if they are different. In a further example, system-specific descriptors "tank content" and "vol." are generalized (i.e. abstracted) to "<volume>".

Coding and de-coding can be implemented by mapping tables or the like.

To address the dual purpose of the laboratory data, data is being communicated in two data types in combination. The combination is made before laboratory data 570 (cf. FIG. 1) becomes available.

First type data (or data of the first type) is reference data for the systems both belonging to production systems 101 (i.e., manufacturing system 130, and optionally process control system 120) and for the computers belonging to the laboratory systems 201 (i.e., laboratory data system 230, and optionally instrument control system 220). First type data (A) comprise identifiers to particular physical samples 115. First type data (A) enables the systems to access data that relates to the particular physical samples 115. Data to-be-accessed can be data that belongs to different data flows, such as sample data 515, laboratory data 570, and measurement data 550.

In the example of FIG. 4, first type data (A) comprises the <sample ID> (that is known from the beginning of T SAMPLE) and refers to laboratory data for that particular sample. There is no need that the data to-be-accessed is available when <sample ID> becomes available. In the example, the data that <sample ID> refers to is symbolized by <ratio> (standing for a ratio of substances) that becomes available when the analysis has been performed.

Since quality data 590 is the result of aggregation, there is no identification of particular physical samples required, so that quality data 590 does not necessarily comprise first type data (A).

Illustrating first type data (A) as <sample ID> is convenient for illustration. However, a sample can be identified otherwise. A computer that belongs to production systems 101 and that requests laboratory data system 230 to assign a <sample ID> sends the request with data such as the identification of a particular production unit, a particular batch, a particular time and so on. Such data is considered first type data (A) as well.

Second type data (B) comprises data required for controlling the production in the control loop (loops that include taking the samples) in case that the sample has been analyzed already. In the example of FIG. 4, second type data (B) comprises the representation of the volume of the substance from that the sample was taken: <volume>. The volume is communicated to the laboratory in combination with first type data (A). Assuming that corrective control signal 136 can be calculated by using a function of the <volume> and <ratio>, wherein the function returns a numeric value regarding a substance to be added (e.g., adding a particular substance in a particular amount).

As used herein, <volume> is an example for technical parameters, such as the following: identification of a particular production unit (and/or of a component), batch ID, location of sample opening etc.

From the view point of data quantity, it may appear contradictive to communicate second type data (B) that is not required for a particular purpose (e.g., for conducting the analysis, the laboratory data system does not require data for the volume). However, from the view point of providing corrective control signal 136 (even in relatively short T CALC), forwarding second type data (B) together with first type data (A) speeds up the process, reduces T DELAY and thereby speeds up the production (production site 100).

Interrelation of the Data Types

Coding/de-coding (via the abstraction) is applicable to both (A) and (B). Also, coding/de-coding makes it easy to differentiate both types.

First type data (A) refers to second type data (B). In the example, <sample ID> refers to <volume>, and both <sample ID> and <volume> are communicated together.

Synergistic Effects

The same data can comprise—as second type data (B)—data for controlling the production (cf. the first perspective control loop), first type data (A) can be used to speed up the control (i.e. to reduce T DELAY).

The approach shows synergistic effects. First, as data goes through laboratory data system 230 (or systems), data of both types (A) and (B) can be collected over time t1, t2 etc. It can be used for aggregation (cf. the second perspective). There is no need to re-collect data (e.g., by a QA system interrogating the IVIES systems for data that is requires for the documentation in quality data 590). As the same data comprises—as second type data (B)—data for controlling the production (cf. the first perspective control loop), the data can be used to speed up the control (i.e. to reduce T CALC because data collection is completed before data is actually required at control signal module 139).

Connector Modules

FIG. 5 illustrates an implementation by that the concepts of abstraction and combination are being implemented by connector module 105 (at the production site) and connector module 205 (at the laboratory site). Connector modules 105/205 can be regarded as middleware between production systems 101 and laboratory systems 201.

The figure also illustrates further computer modules: corrector 135 receives laboratory data, first type data (A) and second type data (B) and can calculate corrective control signal 136. Validator 137 receives the same data and can calculate validation control signal 138. The difference between both signals lies in the function: Corrective control signal 136 instructs production unit 110 (optionally via systems 130/120) to continue the production according to particular technical parameters that are communicated by the signal, and validation control signal 138 instructs production unit 110 to continue the production (i.e., processing the chemical substance), or to interrupt it, as the case may be. This functional differentiation is convenient for explanation, implementations can be modified. For example, an instruction to correct implies an instruction to continue.

Corrector 135 and/or validator 137 can be implemented as part of laboratory data system 230 and/or as part of manufacturing system 130, or as separate entities.

Connector module 105 receives first type data (A) from process control system 120 and receives second type data (B) from manufacturing system 130. This distinction between data sources is convenient, but not required. It is noted that the systems are classified into different IEC-62264-levels, but that connector module 105 can access data from both systems (and hence from systems at different levels). Connector modules 105/205 perform abstraction and combination (as in FIG. 4 and in the further examples to be explained below). Persons of skill in the art can communicatively connect the connector modules to the systems.

Connector module 105 transmits message 150 (or data packages) with first type data (A) and second type data (B) to connector module 205. Messages 150-t1/t2/t3 simply indicates the subsequent transmission of messages.

If needed (depending on the data conventions), connector module 205 performs de-abstraction (i.e. conversion, de-coding to laboratory-system-specific formats), and connector module 205 splits data, with first type data (A) going to laboratory data system 230 (and if available also to instrument control system 220) and second type data (B) going to corrector 135 and/or to validator. Corrector 135 is a computer module that calculates the control signal by using laboratory data, and data from the production process.

Corrector 135 forwards corrective control signal 136 to the production site (i.e. to manufacturing system 130, and—optionally—to process control system 120).

The connector modules are computer modules with computer instructions. It does not matter on which physical computer they are being executed. For example, connector modules 105/205 can be implemented by computers that are installed at the production site and at the laboratory site. It is also possible to implement both connector modules by a single computer. Further, with the trend to use remote computers ("cloud computing"), the computers (for the connector modules) could be remote, in relation to the production site and/or to the laboratory.

As a side-note, systems 130/230, 140/240 can be implemented on remote computers (not on premise) as well.

Although FIG. 5 shows the data flow from left to right, from the production site to the laboratory, the connector modules can optionally be operated in reverse direction (from the laboratory to the production site). An illustration for the reverse direction is given in FIG. 6.

The described approach with sending data (in messages) with first type data (A) and second type data (B), with calculating the control signal and with applying a correction (to production unit 110) corresponds to a control loop (as explained above).

It is not necessary to communicate (A) and (B) in all messages, some messages can be (A) only, some (B) only.

The number of connector modules can correspond to the number of different computer systems. For example, in case of 3 different manufacturing systems, there could be 3 connector modules. The abstraction can be adopted (i.e. limited in complexity) to the data conventions used by the systems (e.g., eventually mapping "item ID" to "sample ID", but not mapping "Probe Nr.").

Scenario 1

In a simplified use case scenario, the description explains synergistic effects for a sample used to measure the SALT/WATER ratio and to react on a deviation from a predefined ratio. The corrective action will be a recipe change.

Figure 6:
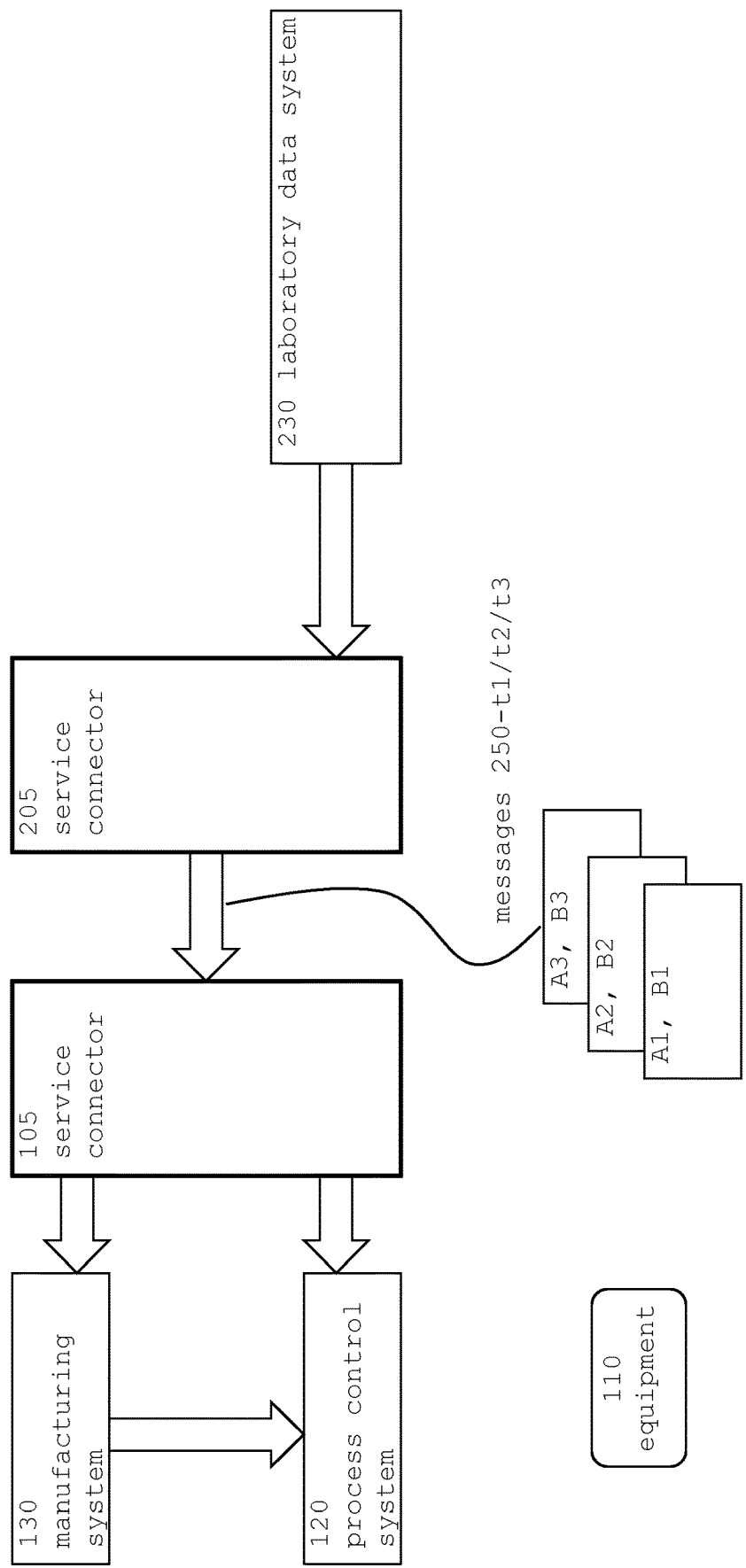
FIG. 6 illustrates an implementation for the connector modules communicating in opposite communication direction.

Laboratory data system 230 assigns a sample ID in relation to a particular processing step (e.g., first step in reactor 110-1, mixing SALT and WATER and forwards the sample ID (as data <sample ID>) to manufacturing system 130 (MES, FIG. 6 in reverse direction, data (A)). At the time of assigning, the physical sample has not yet been taken, but the systems at both sites (in this example, at least laboratory data system 230 and manufacturing system 130) can identify data that relates to the particular sample.

As soon as the operator has taken the physical sample (e.g., sample 115-1 at t1), message 150 goes to laboratory data system 230. Message 150 is being composed by connector module 105 and contains a block with first type data (A): sample ID <sample ID>1234567</sample ID> and a time-stamp <time>2019 02 02 15.00</time>. The message also contains a block with second type data (B) data regarding the volume of WATER in the reactor, <volume>1000</volume>. The volume data is not relevant for the analysis. It does not matter if the reactor contains 1000 liters (as in the example) or 100 liters. The SALT/WATER ratio is the same.

Connector module 205 receives message 150 and differentiates first type data (A) from second type data (B). When laboratory data system 230 receives (A), the propagation delay for the message between connector modules 105 and 205 should be neglected, it adds T SAMPLE (e.g., 2 hours) and determines the arrival time (of the physical sample) to be at 17:00 hours. Laboratory data system 230 sends a control signal to analytical instrument 210 accordingly (e.g., heating it up if needed, calibrating it etc.). The advance notification while the sample is still on its way to the laboratory can shorten T ANALYSIS, cf. FIG. 4 (in comparison to non-prepared instruments).

At approximately 17:00 hours—the exact time does not matter—analytical instrument 210 (cf. FIG. 1) starts the measurement (e.g., spectrometer 210-$i$) and completes the measurement.

At approximately 18:00 hours—T ANALYSIS was less than an hour—laboratory data system 230 has received measurement data 550 (from an analytical instrument), and provides laboratory data:

| <sample ID> | 1234567 | </sample ID> |
|---|---|---|
| <time> | 2019 02 02 15.00 | </time> |
| <ratio> | 0.001 | </ratio> |
| <volume> | 1.000 | </volume> |

In other words, laboratory data 570 not only comprises measurement data but data regarding the volume as well.

Laboratory data system 230 sends laboratory data 570 to corrector 135 that determines the ratio to be too small (non-compliance with a specification to be 0.002) and determines (using the volume) an additional amount SALT to be added. Corrector 135 then sends corrective control signal 136 to reactor 110-1 (cf. FIG. 5, to system 130, further to system 120, further to reactor 110-1). Signal 136 instructs reactor 110.1 to receive a particular amount of SALT.

FIG. 6 illustrates an implementation for connector modules 105 and 205 operate in opposite communication direction. FIG. 6 is similar to FIG. 5, but shows the data flow arrows from the laboratory to the production site. Message 250 goes from connector module 205 to connector module 105.

Implementation of the Connector Modules

To stay with FIGS. 5-6, connector modules 105/205 transmit messages 150/250 at the application layer of the Open Systems Interconnection (OSI) layers according to the standard ITU-T X.200 (07/94).

Connector modules 105/205 can communicate with each other in PUSH mode: connector module 105 initiates the communication of message 150 by transmitting, and connector module 205 initiates the communication of message 250 by transmitting. Connector module 205 is the passive receiver of message 150, and connector module 105 is the passive receiver of message 250. The computer systems that are communicatively coupled to the connector modules receive the messages as well, not necessarily in the same format (due to coding/de-coding), but they receive the content (i.e. data (A)(B)).

In PUSH mode, the receiving module (i.e. connector modules 105 or 205 as the case may be) triggers the computer system to immediately start activities, and or performs the activities alone. Such activities can be, for example:

informing an operator that a message has arrived (optionally as an alarm that lets the operator react without delay, via an interface of the computer system, or of the connector module;

forwarding a control signal (cf. signal 136/138 if communicated in message 250) to a production unit 110; and changing a status variable in a computer system (e.g., to let the system prepare an instrument, to let the system cause a production unit to do something, etc.).

In implementations, connector modules 105/205 can be implemented as plug-ins (sometimes called "add-ins") to host computer systems. For example, connector module 105 can be implemented as plug-in to manufacturing system 130 (or, optionally, to process control system 120), and connector module 205 can be implemented as plug-in to laboratory data system 230.

The person of skill in the art can also implement any of connector modules 105/205 by separate computer systems.

Looking at messages 150/250, they can be composed from predefined templates, with pre-defined data-structures with pre-defined fields, among them: "Production_Event" and "Sample_on_demand", "Unplanned_sample"

The templates are available for situations that occur frequently or typically.

To keep the number of templates relatively low, status information can be encoded. Status information can be related to production unit 110, to process control system 120 etc.

Further Computer Equipment (at Sites 100 and 200)

To provide for interaction with operators (production site 100, and/or laboratory 200), connector modules 105/205 can communicate with a variety of information technology (IT) equipment. It is convenient to stay in the above-mentioned OSI application layer. The equipment includes, for example, the following:

- mobile devices ("smartphones") that are carried one site by the operators, with user interfaces, to communicate details, such as details relevant for taking the samples (first type data (A), communicate events to connector module 105 (e.g., sample was actually taken, time-stamps <time> etc.)
- scanners (to read from bar-codes, QR-codes)
- printers (to print the sample ID to a label for attaching it to the sample)
- interfaces that interact with the operator through augmented reality technologies (for example in the interaction with production units).

The use of these and other computers can reduce the T DELAY, especially in its components T SAMPLE and T SIGNAL. The mentioned equipment can assist the operator to take the sample (reducing T SAMPLE) and to interact with production systems 101 at production site 100 (cf. FIG. 2, reducing T SIGNAL).

Further Computer Equipment (Between Sites 100 and 200)

The figures omit IT equipment that participates in the data communication in the layers below the application layer (cf. OSI-model). Such equipment is well-known in the art. However, in the context of this disclosure, some equipment can be responsive to the messages 150/250 that are exchanged between connector modules 105 and 205. This can be become especially relevant in scenarios where multiple systems are employed (cf. FIG. 3).

In general, messages 150/250 can be routed according to first type data (A) and/or second type data (B) that is encoded in the messages, at a point in time when connector module 105/205 has already transmitted message 150/250.

To give an example, connector module 105 can compose message 105 without knowing the particular laboratory data system that receives it (cf. FIG. 6). Communication tool 160 (cf. FIG. 3) can be implemented as a broker that can read message 105 (i.e. in the application layer of the OSI-model) and can identify—based on (A) or (B)—what laboratory system is the receiving system. This is different from traditionally routing at lower OSI-layers (e.g., using the IP-protocol in the network layer).

Selecting the receiving connector module (i.e., the receiving system at production site 100) when connector module 205 has transmitted message 250 (cf. FIG. 6), is possible for the broker as well.

This approach can inherently add processing time (e.g. to T CALC, to T SIGNAL), but can reduce the number of computer-to-computer interactions to identify a receiving computer by an address at a lower OSI—layer (e.g., IP in OSI 4)

In that sense, data in messages 150/250 is used—similar as in control signal module 139—to control the communication, the data flow. In other words, since at least some of the messages comprise second type data (B) to control the production, second type data (B) can also be used to optimize messaging.

Computer-Implemented Method

Figure 7:
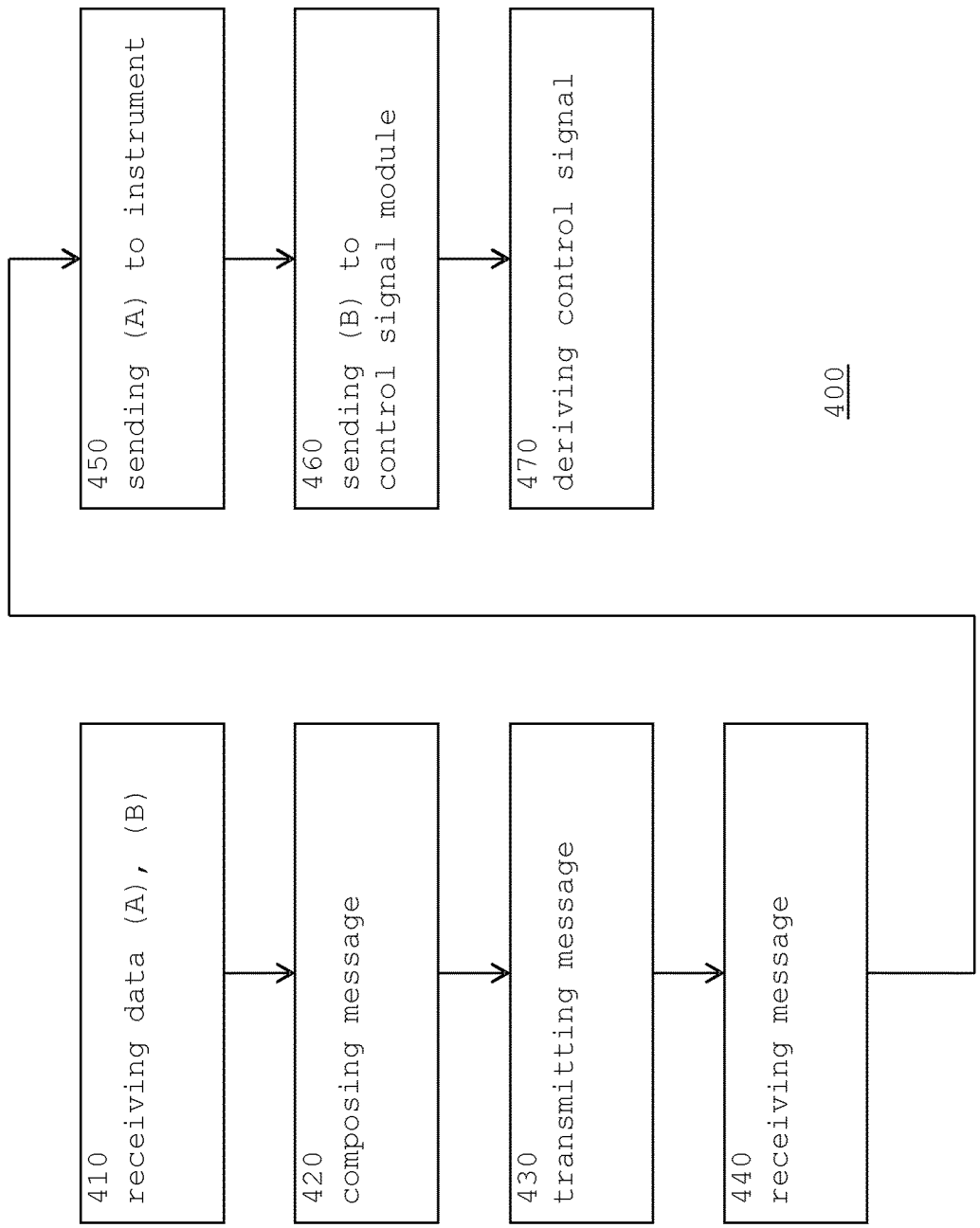
FIG. 7 illustrates a flow chart diagram of a method to control the operation of production units at the production site.

FIG. 7 illustrates a flow chart diagram of method 400 to control the operation of production unit 110 at production site 100. More in detail, method 400 is a computer-implemented method for providing control signal 136/138 (cf. FIG. 5) for a production process. The production process has a first sub-process by that production unit 110 processes a chemical substance at production site 100 (for example, as explained in connection with FIG. 1). The production process has a second sub-process by that a physical sample of the chemical substance is analyzed by analytical instrument 210 at laboratory site 200. According to method 400, first connector module 105 and second connector modules 205 are being operated. Modules 105/205 enable the communication between production systems 101 (i.e., being computer systems at the production site, as in FIG. 2) and laboratory systems 201 (i.e., being computer systems at the laboratory site).

First connector module 105 receives 410 first type data (A) from process control system 120 at production site 100 and second type data (B) from manufacturing system 130, also at production site (100). As explained above, first type data (A) comprises an identifier to particular physical sample 115, wherein the identifier enables production systems 101 and laboratory systems 201 to access data that relates to particular physical sample 115. Second type data (B) comprises data required to derive control signal 136/138 to control the operation of production unit 110. The control is applicable from a point in time when particular physical sample 115 has been analyzed by analytical instrument 110.

First connector module 105 composes 420 message 150 with first type data (A) and with second type data (B).

First connector module 105 transmits 430 message 150 to second connector module 205.

Second connector module 205 receives 440 message 150.

Second connector module 205 sends 450 first type data (A) through (at least one of) the computer systems at laboratory site 200 to analytical instrument 210. Thereby, analytical instrument 210 is caused to analyze physical sample 115 and to obtain laboratory data 570.

Second connector module 205 sends 460 second type data (B) to control signal module 139 (cf. FIG. 5).

Control signal module 139 derives 470 control signal 136/138 for controlling the operation of production unit 110 at production site 100.

Optionally, first connector module 105 performs composing step 420 by composing message 150 at the application layer of the Open Systems Interconnection (OSI) layers according to ITU-T X.200 (07/94).

Optionally, first connector module 105 performs transmitting step 430 by transmitting message 150 via the HTTPS protocol.

Optionally, connector module 105 performs composing step 420 by using predefined templates with pre-defined data-structures having pre-defined fields.

Optionally, first connector module 105 performs composing step 420 by using pre-defined templates by that the pre-defined data-structures indicate status data relating to the production unit 110.

Optionally, control signal module 139 applies validator function 137 (cf. FIG. 5) that validates laboratory data 570 in reference to a pre-defined specification and that derives control signal 138 as validation control signal 138 that instructs the production unit 110 to continue processing the chemical substance in case of compliance with the pre-defined specification, or to interrupt processing otherwise. Optionally, control signal module 139 applies corrector function 135 that uses laboratory data 570 and second type data (B) in reference to the pre-defined specification. Corrector function 135 derives the control signal as corrective control signal 136 that instructs production unit 110 to continue processing the chemical substance according to particular technical parameters that are communicated by corrective control signal 136.

Optionally, control signal module 139 communicates control signal 136/138 via second connector module 205 to manufacturing system 130 at production site 100.

Optionally, second connector module 205 sends messages 250 with first type data (A) in advance of taking physical samples 115, via first connector module 105.

Optionally, control signal module 139, after having derived control signal 136/138, sends it to production unit 110 at production site 100.

Computer Program

FIG. 7 also illustrates a computer program or a computer program product. The computer program product—when loaded into a memory of a computer and being executed by at least one processor of the computer—performs the steps of the computer-implemented method. So in other words, the blocks in FIG. 7 illustrate that the method can be implemented by a computer (or by computers) under the control of the program.

System

Returning to FIG. 5, the bold-illustrated components can be considered as control system 105/205/139 for providing control signal 136, 138 for a production process. As mentioned, the production process has first and second sub-processes. Control system 105/205/139 comprising connector modules 105 and 205 as well as control signal module 139.

Connector module 105 is adapted to receive 410 first type data (A) from process control system 120 at production site 100 and second type data (B) from manufacturing system 130 at production site 100, with the function of the data explained above. Connector module 105 is further adapted to compose 420 message 150 with first and second type data (A)(B) and to transmit 430 message 150 to connector module 205.

Connector module 205 is adapted to receive 440 message 150 and to send 450 first type data (A) through at least one of computer systems 201, 230, 220 at laboratory site 200 to analytical instrument 210, causing it to analyze physical sample 115 and to obtain laboratory data 570. Connector module 205 is further adapted to send 460 second type data (B) to control signal module 139. Control signal module 139 is adapted to derive 470 control signal 136/138 (by using laboratory data, second type data (B)) for controlling the operation of production unit 110 at production site 100.

Further Use Case Scenarios

The description now explains advantages of using abstraction and combination by explaining further use case examples in chemical industry.

Scenario 2

To stay with the example, laboratory data system 230 can execute a test plan (or sampling plan) and can assign further sample IDs for particular processing steps (e.g., first step in reactor 110-1, mixing SALT and WATER and can forward the further sample IDs to the manufacturing system 130 as well (reverse direction). In other words, the further sample IDs can serve as notifications for the operator to take further samples 115-1-$t2$, 115-1-$t3$ and so on.

Laboratory data system 230 uses connector module 205 to transmit the sample IDs as data (A) in one or more messages 250. There can be multiple messages 250, each one with a sample ID, or there can be a single message, with multiple sample IDs.

Just communicating the sample IDs is a convenient simplification, but message 250 can comprise further data. It is noted that particular processing requirements can be taken into account, such as the above-mentioned process parameter T MIX. In such case, the laboratory data system could transmit the sample ID (i.e. the notification) when T MIX is over.

Assuming that a further sample was taken (at $t2=19{:}00$ hours) and that message 150-$t2$ would be transmitted (from connector module 105 via connector module 205 to system 230).

The analysis would result in the following data (cf. FIG. 4):

| | | |
|---|---|---|
| <sample ID> | 2345678 | </sample ID> |
| <time> | 2019 02 02 19.00 | </time> (data (A)) |
| <ratio> | 0.002 | </ratio> (i.e. laboratory data) |
| <volume> | 1.000 | </volume> (data (B)) |

Validator 137 receiving this data determines compliance (an optionally performs plausibility checks according to rules) sends validation control signal 138 to reactor 110-1 to forward SOLUTION to reactor 110-2. Again, this control signal is derived from laboratory data. Although in this example, there is no need to provide corrective control signal 136, and no need to process the volume indication (data (B)). However, second type data (B) is ready and available, and—in case of non-compliance—data (B) could have been used immediately to calculate corrective control signal 136.

Scenario 3

Looking at production site 100, process control system 120 sends signals (with measurement data and the like) to manufacturing system 130. System 130 determines that production is being started. System 130 uses connector module 105 to inform that laboratory data system 230 accordingly. In the example, message 150 is composed according to the Production_Event template (</ . . . > left out for simplicity, comma instead of line breaks): <production-start>, <time>, <unit>, <status>, <material>, <volume>, <sample ID>

Using the data from system 130, connector module 105 composes message 150 to read as:

| | |
|---|---|
| <production start> | YES |
| <time> | 2019 02 02 19.59 |
| <unit> | mixer 110-1 |

-continued

| | |
|---|---|
| <status> | running |
| <material> | SALT, WATER |
| <volume> | n/a |
| <sample ID> | requested |

The sample ID being first type data (A) is not yet known, but given as a placeholder. The same applies for <volume> being second type data (B). Accordingly, laboratory data system 230 applies a test plan in "start mode" and assigns a relatively high number of sample IDs with relatively short intervals (t1 to t2 to t3 etc.) between taking sample.

Next, the samples arrive, accompanied by message 150-*t*1/t2/t3 etc. The messages are being updated, with message 150-*t*2 as in the following example:

| | |
|---|---|
| <production start> | YES |
| <time> | 2019 02 02 20.02 |
| <unit> | mixer 110-1 |
| <status> | running |
| <material> | SALT, WATER |
| <volume> | 1000 |
| <sample ID> | 123456 |

Corrector 135 and/or validator 137 provide control signals 136/138 accordingly until the production is stable (according to pre-defined criteria, for example regarding the SALT/WATER ratio). The stability is communicated again (message 150, Production_Event) to laboratory data system 230. As a consequence, laboratory data system 230 changes the testing plan to "normal mode" (with less sample taking per time).

In case of an unexpected event during production, the connector modules exchange messages that eventually change the test plan again, to "start mode" or to a "distortion mode" (production process not according to schedule).

Scenario 4

In a variation of scenario 3 (start of production), the end of a production process can be detected as well. Laboratory data system 230 receiving a message (e.g., <production ended>) stops creating sample ID (for the particular production) and—after having received and analyzed the last sample—it forwards laboratory data to the QA system.

In this respect, using second type data (B) is advantageous. Second type data (B) can comprise details regarding material consumption (e.g., the volume of WATER used by reactor 110-1) and product details (e.g., a value for COLORED SOLUTION at the output of reactor 110-3). Laboratory data system 230 and QA system 240 can use that data to evaluate the production and to allow (or to deny) shipment. It is also possible to classify the products accordingly, for example, in the first class products and second class products.

Scenario 5

Assuming that the operator (production site 100) detects a deviation from a pre-defined schedule (e.g., overheating of reactor 110-2), he interacts with manufacturing system 130 to trigger an exceptional sample 130-2. System 130 informs connector module 105. (It is contemplated that the operator could interact with connector module 105 directly). Connector 105 uses a sampling information template, with a field <Provide Proposal>=YES. Laboratory data system 230 returns (via message 250) a selection of possible methods to inspect samples (i.e. by the analysis instruments, spectrometer and/or viscometer). Referring to FIG. 1 this would be an indication of different opening 111-2 at reactor 110-2 and opening 111-3 at reactor 110-3 (i.e. for a sample 130-3). The operator selects one or more options. The next message (message 150) informs laboratory data system 230 accordingly. Assuming the operator selected both options, laboratory data system 230 would return message 250 via connectors 105/205 to send sample IDs to manufacturing system 130.

Taking samples according to one of the above-mentioned test plans is potentially not sufficient, especially when the production deviates from schedule (given by system 130). The operator can interact with connector module 105 to demand a new sample ID. According to a predefined template (e.g., "sample_on_demand" or "unplanned_sample"), connector module 105 can collect parameters from the operation units. The parameters can comprise status information referring to a unit (unit running, or unit stopped), measurement values regarding the unit (<unit> to identify the unit, <temperature> as a measurement value), the production (<batch> to link the data to data from the ERP system, <material> or <volume> relating to the material). Connector module 105 can forward message 150 to laboratory data system 230 (via connector module 205). Laboratory data system 230 can add a sample ID <sample ID> and can add options, such as to identify a particular unit <unit>, a particular opening of the unit (<sample opening>). Laboratory data system 230 can select the option(s) according to rule that take production schedules into account. To stay with the above example, the rules can represents the basics for the production (SALT, MATERIAL etc. to COLORED SOLUTION by using reactors 110-1/2/3). Laboratory data system 230 (in cooperation with connector module 205) can then enhance the template and return the (enhanced) template in message 250 to manufacturing system 130 (and/or to connector module 105). The operator can then select one of the options and take the sample. It is noted that each option can be related to a sample ID. For example, the first option means taking samples from all reactors 110-1/2/3, the second option means taking a sample from reactor 110-2 only. In the next communication, the message is enhanced one more, indicating the operator's choice (e.g., second option) and—at least implicitly—indicating that the physical sample 115-2 from reactor 110-2 is on its way to laboratory site 100, and that the remaining two sample IDs have to be cancelled.

Scenario 6

In a modification of the previous scenario 4, there is not only operator-to-system interaction to take a sample exceptionally, but also data processing of measurement data (from system 120, with production processing parameters) with production planning parameters (from system 130). As a consequence, the sampling request (i.e., a request to assign a sample ID) is enhanced (by second type data (B)). Laboratory data system 230 receiving message 150 with the enhanced request can determine the proposed options with more detail. For example, while taking samples 130-2 from reactor 110-2 is still be a recommended option, laboratory data system 230 could add a further, more appropriate option: to take a sample from 110-2 again, but within a 5 minute waiting time between the sample and by operating a heater switch. Here in this example, data (B) is used, and—similar to corrector 135—laboratory data system 230 determines the appropriate sampling approach. This is similar to correction control signal 136, but applied for taking the samples.

Scenario 7

Occasionally, laboratory data system 230 has assigned a sample ID, but for some reasons, the sample is not taken. In this case, the sample ID needs to be cancelled. This can be triggered from any system (that communicates with the connector modules). However, the cancellation comprises a confirmation or registration that sample-taking was cancelled.

It is convenience to use predefined field in the messages, such as status fields.

Since—as explained above—laboratory data is potentially used by QA system 240 as well, the cancellation can be extended from laboratory data system 230 to QA system 240.

Control Loop Across Systems

The description now discusses some aspects in view the above-mentioned prior art reference Davis et al. Davis describes a production facility for semiconductor substrates (or "wafer fab"). Measurement results (such as of thickness measurements) are used to calculate processing parameters. For example, the processing step "etching" changes a thickness (of particular layers) so that measuring is required to arrive at a desired thickness. Davis refers to a control loop (with the thickness as the goal) and with etch process parameters (such as temperature, etch agent and the like). The control loop is limited to the single apparatus.

In contrast, the disclosure herein refers to a control loop to accommodate technical deviations during production, but wherein the control loop crosses the borders of different computer systems (cf. FIG. 2).

Davis refers to a wafer that enters (and leaves) the etch reactor. In semiconductor industry, the wafers are sometimes called "substrate". Being made of silicon, such wafers are very sensitive. They have to be transported in special containers and taking samples (in the sense of fractions of the thing) is not possible. In other words, cutting away a piece of wafer to have it analyzed is not possible. Taking samples would destroy the wafer. Transport-sensitivity in combination with non-availability of samples let wafer processing equipment perform measuring, inspecting within the reactor. The wafer remains a wafer so that no samples are removed from the wafer.

In contrast, the approach described herein differentiates locations by the sample criterium: There is a site that provides the sample (production site) and there is a different site that receives the sample (laboratory site).

The production must be controlled at a point in time when the physical sample has been analyzed, to obtain the control signal, further data must be considered, and there is a problem to have the data ready when needed. Second type data (B) from the manufacturing system is forwarded to the control module (right side of the figures). The data enables the control module to identify the correct correction etc. within a short time. There is no need for a time-consuming search etc.

Further Implementation Details

Since sample IDs are usually assigned by laboratory data system 230 (and not by a systems 101 at production site 100), data to prepare the sample-taking is communicated via connector modules 205 and 105 to manufacturing system 130, and eventually forwarded further via process control system 120 to equipment 110. Such preparatory data can include first type data (A) (e.g., <sample ID>123456<sample ID>) and second type data (B) (e.g., <opening>XYZ </opening><temperature>100</temperature> as a technical parameter indicating a particular opening at particular equipment, as well as temperature conditions).

Since messages 150/250 can be coded into the above-mentioned application layer, and since transmitting (in both directions) can use the Internet, security measures such as encryptions can be used. The use of the HTTPS protocol is an example.

Figure 8:
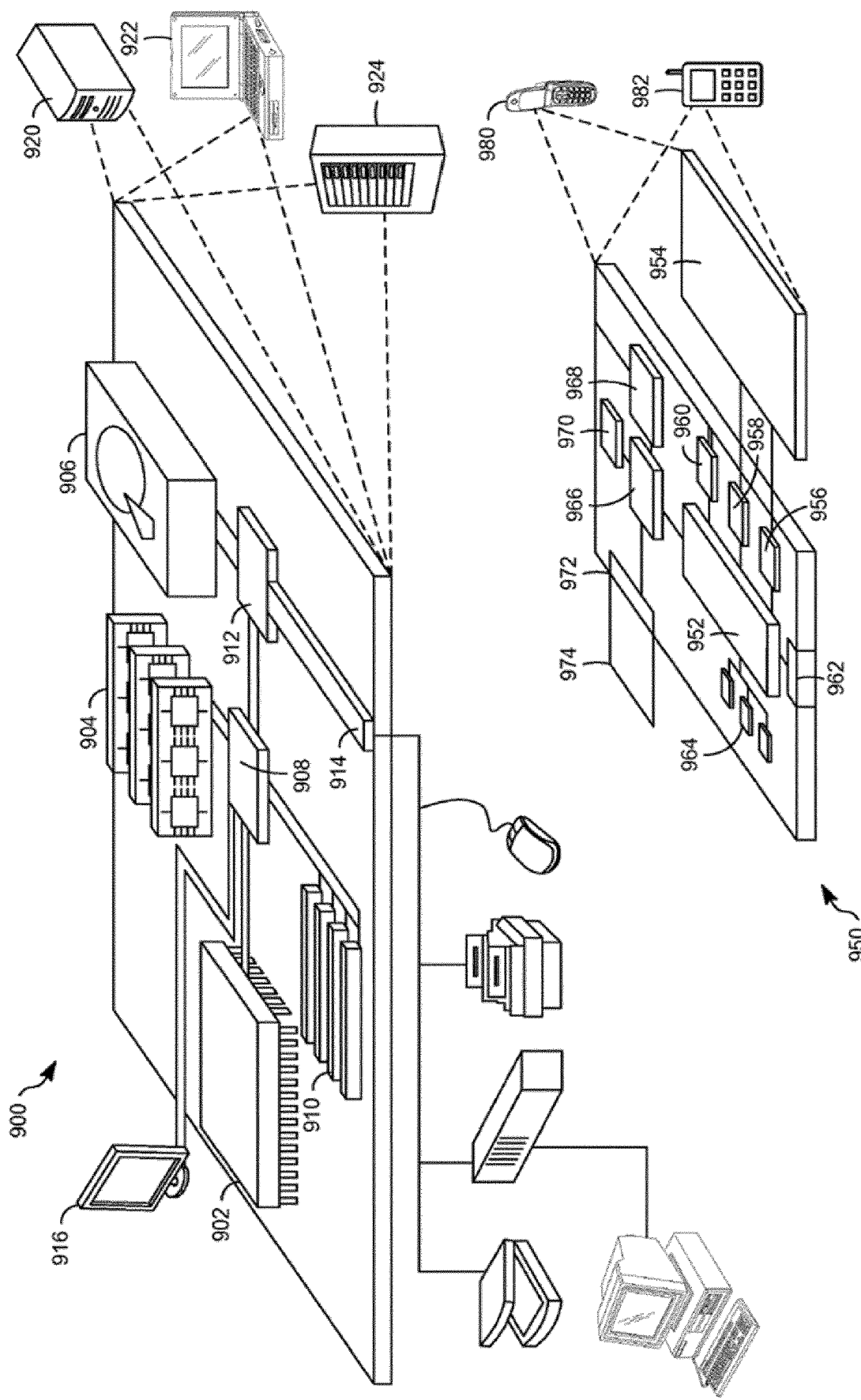
FIG. 8 illustrates an example of a generic computer device and a generic mobile computer device, which may be used with the techniques described here.

FIG. 8 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a micro-drive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method (400) for providing a control signal (136, 138) for a production process, the production process having a first sub-process such that a production unit (110) processes a chemical substance (1, 2, 3, 4, 5, 6) at a production site (100), and having a second sub-process such that a physical sample (115) of the chemical substance is analyzed by an analytical instrument (210) at a laboratory site (200), the method (400) performed via operating a first connector module (105) and a second connector module (205) that enable communication between production systems (101) being computer systems (120, 130) at the production site (100) and laboratory systems (201) being computer systems (220, 230) at the laboratory site (200), the method (400) comprising:

by the first connector module (105), receiving (410) first type data (A) from a process control system (120) at the production site (100) and second type data (B) from a manufacturing system (130) at the production site (100), with first type data (A) comprising an identifier to a particular physical sample (115), wherein the identifier is a reference for the production systems (101) and the laboratory systems (201) to access data that relates to the particular physical sample (115), and with second type data (B) comprising data required to derive the control signal (136, 138) to control the operation of the production unit (110) after a point in time when the physical sample (115) has been analyzed by the analytical instrument (110);

by the first connector module (105), composing (420) a message (150) with first type data (A) and with second type data (B);

by the first connector module (105), transmitting (430) the message (150) to the second connector module (205);

by the second connector module (205), receiving (440) the message (150);

by the second connector module (205), sending (450) first type data (A) through at least one of the computer systems (201, 230, 220) at the laboratory site (200) to the analytical instrument (210), causing the analytical instrument (210) to analyze the physical sample (115) and to obtain laboratory data (570);

by the second connector module (205), sending (460) second type data (B) to a control signal module (139); and by the control signal module (139), deriving (470) the control signal (136, 138) for controlling the operation of the production unit (110) at the production site (100), by using laboratory data (570) and second type data (B).

2. The method (400) according to claim 1, wherein the first connector module (105) performs the composing step (420) by composing the message (150) at an application layer of Open Systems Interconnection (OSI) layers.

3. The method (400) according to claim 2, wherein the first connector module (105) performs the transmitting step (430) by transmitting the message (150) via the HTTPS protocol.

4. The method (400) according to claim 1, wherein the first connector module (105) performs the composing step (420) by using predefined templates with pre-defined data-structures having pre-defined fields.

5. The method (400) according to claim 4, wherein the first connector module (105) performs the composing step (420) by using pre-defined templates such that the pre-defined data-structures indicate status data relating to the production unit (110).

6. The method (400) according to claim 1, wherein the control signal module (139) applies a validator function (137) that validates the laboratory data (570) in reference to a pre-defined specification and that derives the control signal (138) as a validation control signal (138) that instructs the production unit (110) to continue processing the chemical substance (1, 2, 3, 4, 5, 6) in case of compliance with the pre-defined specification, or to interrupt processing otherwise.

7. The method (400) according to claim 6, wherein the control signal module (139) applies a corrector function (135) that uses the laboratory data (570) and second type data (B) in reference to the pre-defined specification that derives the control signal (136) as a corrective control signal (136) that instructs the production unit (110) to continue processing the chemical substance (1, 2, 3, 4, 5, 6) according to particular technical parameters that are communicated by the corrective control signal (136).

8. The method (400) according to claim 7, wherein the control signal module (139) communicates the control signal (136, 138) via the second connector module (205) to the manufacturing system (130) at the production site (100).

9. The method (400) according to claim 1, wherein the second connector module (205) sends messages (250) with first type data (A) in advance of taking physical samples (115).

10. The method (400) according to claim 1, wherein the control signal module (139), after having derived the control signal (136, 138), sends the control signal to the production unit (110) at the production site (100).

11. One or more processors configured to perform the computer-implemented method according to claim 1.

12. A control system for providing a control signal (136, 138) for a production process, the production process having a first sub-process such that a production unit (110) processes a chemical substance (1, 2, 3, 4, 5, 6) at a production site (100), and having a second sub-process such that a physical sample (115) of the chemical substance is analyzed by an analytical instrument (210) at a laboratory site (200), the control system comprising a first connector module (105) and a second connector module (205) adapted to enable communication between production systems (101) being computer systems (120, 130) at the production site (100) and laboratory systems (201) being computer systems (220, 230) at the laboratory site (200), the control system characterized in that:

the first connector module (105) is adapted to receive (410) first type data (A) from a process control system (120) at the production site (100) and second type data (B) from a manufacturing system (130) at the production site (100), with first type data (A) comprising an identifier to a particular physical sample (115), wherein the identifier is a reference for the production systems (101) and for the laboratory systems (201) to access data that relates to the particular physical sample (115), and with second type data (B) comprising data required to derive the control signal (136, 138) to control operation of the production unit (110) from a point in time when the physical sample (115) has been analyzed by the analytical instrument (110), the first connector module (105) is further adapted to compose (420) a message (150) with first type data (A) and with second type data (B), and to transmit (430) the message (150) to the second connector module (205);

the second connector module (205) is adapted to receive (440) the message (150) and to send (450) first type data (A) through at least one of the computer systems (201, 230, 220) at the laboratory site (200) to the analytical instrument (210), causing the analytical instrument (210) to analyze the physical sample (115) and to obtain laboratory data (570);

the second connector module (205) further adapted to send (460) second type data (B) to a control signal module (139); and the control signal module (139) is adapted to derive (470) the control signal (136, 138) for controlling the operation of the production unit (110) at the production site (100) from laboratory data (570) and from second type data (B).

* * * * *

UNITED STATES PATENT AND TRADEMARK OFFICE
CERTIFICATE OF CORRECTION

PATENT NO. : 12,111,640 B2
APPLICATION NO. : 17/427952
DATED : October 8, 2024
INVENTOR(S) : Michael Pfaffmann et al.

Page 1 of 1

It is certified that error appears in the above-identified patent and that said Letters Patent is hereby corrected as shown below:

On the Title Page

Page 2, in Column 1, item [57], Line 1, "sub- process" should be -- sub-process --.

In the Claims

Column 28, Line 10, "instrument (110);" should be -- instrument (210); --.

Column 28, Line 39, "via the" should be -- via --.

Column 30, Line 11, "instrument (110)," should be -- instrument (210), --.

Signed and Sealed this
Second Day of September, 2025

Coke Morgan Stewart
*Acting Director of the United States Patent and Trademark Office*